US010689900B2

(12) United States Patent
Caliaro et al.

(10) Patent No.: US 10,689,900 B2
(45) Date of Patent: Jun. 23, 2020

(54) PROCESS FOR MANUFACTURING INSULATING GLAZING

(71) Applicant: AGC GLASS EUROPE, Louvain-la-Neuve (BE)

(72) Inventors: Sebastien Caliaro, Morialme (BE); Julien Jeanfils, Thorembais-St-Trond (BE); Francois Closset, Jalhay (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 442 days.

(21) Appl. No.: 15/510,528

(22) PCT Filed: Oct. 6, 2015

(86) PCT No.: PCT/EP2015/073050
§ 371 (c)(1),
(2) Date: Mar. 10, 2017

(87) PCT Pub. No.: WO2016/055477
PCT Pub. Date: Apr. 14, 2016

(65) Prior Publication Data
US 2017/0247936 A1 Aug. 31, 2017

(30) Foreign Application Priority Data
Oct. 7, 2014 (EP) .................... 14187916

(51) Int. Cl.
*E06B 3/96* (2006.01)
*E06B 3/66* (2006.01)
(Continued)

(52) U.S. Cl.
CPC ............ *E06B 3/9604* (2013.01); *B23K 1/002* (2013.01); *B23K 1/0008* (2013.01); *B23K 1/19* (2013.01);
(Continued)

(58) Field of Classification Search
CPC .. E06B 3/6715; E06B 3/6612; E06B 3/67326; E06B 3/66304; E06B 3/66;
(Continued)

(56) References Cited

U.S. PATENT DOCUMENTS 2,909,814 A 10/1959 Schwartz
2012/0222373 A1 9/2012 Bouesnard et al.
(Continued)

FOREIGN PATENT DOCUMENTS

WO 2011/061208 A1 5/2011
WO 2011/072646 A2 6/2011

OTHER PUBLICATIONS

International Search Report dated Jan. 21, 2016 in PCT/EP2015/073050 Filed Oct. 6, 2015.

*Primary Examiner* — Serkan Akar
*Assistant Examiner* — Chris Q Liu
(74) *Attorney, Agent, or Firm* — Oblon, McClelland, Maier & Neustadt, L.L.P.

(57) ABSTRACT

The invention relates to a process for manufacturing a vacuum insulated glazing wherein the glazing is assembled in a single stage by supplying glass panes, metallic spacers and corner and frame metallic seal elements which are brazed onto adhesion layers previously deposited onto the edge region areas of the glass panes.

17 Claims, 4 Drawing Sheets

(51) Int. Cl.
*E06B 3/663* (2006.01)
*B23K 1/00* (2006.01)
*B23K 1/002* (2006.01)
*B23K 1/19* (2006.01)
*E06B 3/673* (2006.01)
*E06B 3/677* (2006.01)
*C23C 4/129* (2016.01)
*B23K 35/30* (2006.01)

(52) U.S. Cl.
CPC ............ *B23K 35/302* (2013.01); *C23C 4/129* (2016.01); *E06B 3/6612* (2013.01); *E06B 3/6617* (2013.01); *E06B 3/66304* (2013.01); *E06B 3/66357* (2013.01); *E06B 3/677* (2013.01); *E06B 3/67365* (2013.01); *E06B 3/66347* (2013.01); *E06B 3/66366* (2013.01); *E06B 3/66371* (2013.01); *E06B 3/6775* (2013.01); *Y02A 30/25* (2018.01); *Y02B 80/24* (2013.01)

(58) Field of Classification Search
CPC .... E06B 3/6775; E06B 3/66352; E06B 3/663; E06B 3/66309; E06B 3/66319; E06B 3/66333; E06B 3/66342; E06B 3/6617; E06B 3/677; E06B 3/6621; E06B 3/66347; E06B 3/66357; E06B 3/673; E06B 3/66328; E06B 3/667; E06B 3/67; E06B 3/6722; E06B 3/67308; E06B 3/67343; E06B 3/66371; E06B 3/67321; E06B 3/67334; E06B 3/67365; E06B 3/67369; E06B 3/67382; B23K 1/0008; B23K 1/002; B23K 1/06; B23K 1/19; B23K 35/302
USPC ....... 219/203, 522, 543, 219, 541, 200, 202, 219/214, 218, 544, 548, 121.47, 205, 230, 219/438, 443.1, 444.1, 451.1, 465.1, 219/466.1, 467.1, 476, 477, 478, 509, 219/538, 546, 547, 633, 85.22
See application file for complete search history.

(56) References Cited

U.S. PATENT DOCUMENTS

| | | | |
|---|---|---|---|
| 2012/0269996 A1* | 10/2012 | Jager | E06B 3/6612 428/34 |
| 2014/0220268 A1* | 8/2014 | Dreux | E06B 3/6775 428/34 |
| 2015/0020466 A1 | 1/2015 | Bouesnard et al. | |

* cited by examiner

PROCESS FOR MANUFACTURING INSULATING GLAZING

TECHNICAL DOMAIN OF THE INVENTION

The present invention relates to a process for manufacturing thermally insulating glazing such as vacuum glazing. The present invention also relates to the glazing thus obtained.

BACKGROUND OF THE INVENTION

In general, vacuum glazing is composed of a minimum of two glass panes separated by a void space with a thickness in the range starting at 100 µm and up to 800 µm. Sealing is obtained by a peripheral seal. To achieve super-insulation performances (coefficient of surface transmission U<0.6 w/m²K), the vacuum level between the glass panes must be in the order of $10^{-3}$ mbar or less, and generally at least one of the two glass panes must be covered by a low-emissivity layer having an emissivity of ideally less than 0.05.

Different seal technologies exist and each has some disadvantages. A first type of seal (the most widespread) is a seal based on a welding glass, the melting temperature of which is lower than that of the glass of the glazing panes. The use of this type of seal limits the choice of low-emissivity layers to those that are not impaired by the thermal cycle necessary for usage of the welding glass, i.e. to that which is resistant to a temperature that can be up to 350° C. Moreover, since this type of seal based on welding glass has very low deformability, it does not allow absorption of the effects of differential expansions between the glass pane of the glazing on the internal side and the glass pane of the glazing on the external side when these are subjected to substantial differences in temperature (e.g. 40° C.). Quite significant stresses are thus generated on the periphery of the glazing and can cause breakages of the glass panes of the glazing.

A second type of seal comprises a metal seal, e.g. a metal strip with a low thickness (<500 µm) welded around the periphery of the glazing by means of an attachment sub-layer covered at least partially with a layer of a solderable material such as a tin alloy soft solder. A significant advantage of this second type of seal over the first type of seal is that it can be deformed to absorb the differential expansions created between the two glass panes.

Patent application US 2008/0245011 A1 discloses a method for manufacturing a vacuum insulated double glazing having a peripheral vacuum-tight edge connection by welding together two metal foil strips connected to the peripheral zones of each glass pane's inner glazing face, the strips protruding beyond the edges of the glass panes. Welding is performed by sweeping a laser beam along the protruding parts of the metal foil strips.

Such glazing does not allow edge connections which do not extend outside the periphery of the panes. Additionally, after being welded together, the protruding parts of the foil strips must be bended onto the glass pane edges and mechanical weaknesses may be introduced in the bending areas.

Another disadvantage of the glazing according to US 2008/0245011 A1 is that mechanical stresses may still take place during the welding operation which is performed one zone at a time as the laser beam sweeps along.

SUMMARY OF THE INVENTION

An aspect of the present invention proposes to use a metal type seal, e.g. a metal strip, for vacuum insulating glazing (i.e. for multiple glazing, e.g. double or triple glazing). In fact, it has surprisingly been observed that such a seal allows to guarantee the maintain of a sufficient level of vacuum ($<10^{-3}$ mbar) for the classic service life of vacuum glazing systems (10 years). One advantage of some embodiments of the present invention is good adhesion to glass panes. Another advantage of some embodiments of the present invention is that they are conducted in a simple manner at reasonable cost.

Other advantages of some embodiments of the present invention are namely:

To allow an efficient and cost competitive manufacturing of made-to-measure frames adapted to various sizes of glazings.
To allow the in situ formation of the frame.
To allow the manufacturing of large size glazings.
To allow an efficient manufacturing of the peripheral seal adapted to various sizes of glazings.

A matching of the thermal expansion coefficients of the seal material and of the glass is no more required for the brazing operations. Still another advantage of some embodiments of the present invention is that it has surprisingly been observed that the pane substrates are not damaged by the process (no cracking observed during optical microscope analysis).

Another advantage of some embodiments of the present invention is that windows having lower thermal transmittance of ($U_w$) may be obtained.

The pressure inside the vacuum glazing is preferably lower than $10^{-3}$ mbar so that it retains its super-insulation energy-saving properties for a working period. Consequently, the acceptable pressure build-up during the life of the product is preferably in the same order of magnitude at the highest. Some embodiments of the present invention allow a vacuum of less than $10^{-4}$ to $10^{-3}$ mbar to be retained in the interior of a glazing for 10 years.

In a first aspect, the present invention aims at avoiding the disadvantages of the prior art by supplying a process for manufacturing a vacuum insulating glazing comprising at least two glass panes, a set of metallic spacers located in the void space between the glass panes and a peripheral seal ensuring a vacuum tightness between the panes wherein the process comprises the following steps:

a) depositing an adhesion layer onto a peripheral zone on one side of each glass pane;

b) supplying the glass panes separated with the set of spacers in a stack alignment;

c) assembling the glazing in a single step comprising:
  supplying and brazing corner metallic seal elements at each corner of the pane stack onto the adhesion layers of each glass pane,
  supplying multiple frame metallic seal elements on the edges of the glass panes between the corner metallic seal elements and
  brazing the frame metallic seal elements onto the adhesion layers of each glass pane;

d) unloading the finished glazing, wherein the multiple frame metallic elements are supplied in a manner that they each overlap the adjacent frame or corner element for a distance no greater than 3.5 mm and each frame metallic seal element is let to overlap further the adjacent frame or corner metallic seal element by free dilatation during the brazing for forming the peripheral seal.

DETAILS OF THE INVENTION

By vacuum insulating glazing, we intend to mean a multiple glazing made of several glass panes separated by thin void spaces wherein remaining pressure of gas is at most $10^{-3}$ mbar.

The vacuum insulated glazing obtained by the process according to the invention makes use of spacers between each pair of adjacent glass panes delimiting a void space. Those spacers aim at maintaining the same distance between the panes, which otherwise would tend to collapse under the pressure of the atmosphere surrounding the glazing, especially for larger pane sizes. Generally, the spacers are made of a material which resists without deformation to compression stress. They may be made of various material of high resistance to compression. Metallic spacers, like steel or aluminum spacers have given good results. Their design is tuned to conceal the smallest surface possible between the glass panes, while maintaining their rigidity. Spacers are arranged at more or less regular intervals between the adjacent panes, depending of the size of the latter. Their number is adapted as well to the surface of the glazing, ranging from no spacer at all for very small glazings, to several tens for large sizes through one only or a few units only for mid-sized glazings. The wording "set of spacers" used herein intends to designate a number of spacers, ranging from 0 to a positive integer representing the quantity required to maintain an even distance between the glass panes. Preferably, at least one spacer is used between each pair of adjacent glass panes. The spacers of the set are arranged in the entire vacuum cavity or void space between adjacent panes. For very small sizes of glazings, one can put only one spacer at the center of the glazing or even omit any spacer at all and rely on the natural rigidity of the glass panes to avoid their collapse.

The process according to the invention is able to deliver glazings which ensure a vacuum tightness between the panes. As explained above, the remaining pressure of gas between the panes is at most $10^{-3}$ mbar. Additionally, the process according to the invention is able to guarantee the maintenance of a sufficient level of vacuum ($<10^{-3}$ mbar) for the classic service life of the vacuum glazing systems (10 years, in general). The process according to the invention is able to reach that vacuum performance thanks to the realisation of a peripheral seal along all the edges of the panes. By peripheral seal is meant here the adhesion layer and the corner and frame metallic seal elements.

According to the invention, the process comprises several steps, namely:
  a) a first step comprising the deposition of an adhesion layer onto a peripheral zone on at least one of both sides of each glass pane;
  b) a second step comprising the elaboration and the supply of a stack of the panes coming from the first step, separated by a set of spacers between each adjacent panes intended to delimit a void space;
  c) a single third step of assembling the glazing with the aid of several sealing elements and
  d) a final fourth step of unloading the finished glazing.

Steps a) to d) are performed in this order. It means that the process may comprise additional steps that can take place before, after and/or between steps a) to d), but steps a) to d) have to be performed in this relative order and cannot be inverted. Additional steps may be steps known to the skilled person in the preparation of a vacuum insulating glazing such as described for instance in WO 2011/061208 A1, WO 2013/034348 A1, WO 2013/174994 A1, WO 2014/108274 A1.

The first step of the process according to the invention comprises the deposition of an adhesion layer made of an adhesive material selected from the group comprising copper, aluminum, iron, platinum, nickel, gold, silver, titanium, tin and their alloys. Advantageously, the adhesive material has a thermal expansion coefficient of 3 to $23.10^{-6}$ $K^{-1}$, preferably 4 to $18.10^{-6} K^{-1}$ and, more preferably, 5 to $16.10^{-6}K^{-1}$. The deposition of the adhesion layer may be performed by a conventional method of low-velocity flame spraying or by the new method using a HVOF (high-velocity oxy/fuel) spraying method. The latter method has been disclosed in details in the international patent application of AGC Glass Europe WO 2011/061208 A1 incorporated here by reference. The HVOF method of deposition is preferred.

The adhesion layers are deposited on peripheral zones of the glass panes. By peripheral zones it is intended a zone of a width ranging from 0.5 cm to 5.0 cm along the whole edges of the pane at a distance from the edge ranging from 0 to 10 cm.

For making double glazing according to the process of the invention, an adhesion layer is deposited on one side only of the glass panes. For making multiple glazings comprising at least 3 panes, the two outer panes are deposited with peripheral adhesion layers on one side only, while the inner panes are deposited on one or both their sides with peripheral adhesion layers, according to the design of the sealing elements. This will be explicitated later in connection with the examples and the figures.

By extension, the wording "peripheral zone" intends as well to designate the whole surfaces themselves of the edges of the glass panes as it will be illustrated later by the figures.

In the second step of the process according to the invention, the spacers are arranged between the glass panes which will delimit a void space and which are supplied in a stack configuration. In that step of the process, in the case of manufacture of a multiple glazing with void space between some panes and gas filled space between other glass panes, the set of spacers is only arranged between the panes which will delimit the void space and not between the panes delimiting spaces intended to receive the gas filling. In the case of a multiple glazing with only void spaces between the panes, a set of spacers is arranged in all the spaces.

The third step of the process according to the invention is devoted to the assembling of the glazing and comprises several simultaneous actions:
  a) supplying and brazing corner metallic seal elements at each corner of the pane stack;
  b) supplying multiple frame metallic seal elements on the edges of the glass panes between the corner metallic seal elements and
  c) brazing the frame metallic seal elements onto the adhesion layers of each glass pane.

During that third step, two kinds of metallic seal elements are supplied and brazed simultaneously, i.e. corner and frame, or straight, metallic seal elements. Both kinds are generally made of metallic profiles like, e.g. extruded profiles. Both kinds of metallic seal elements are advantageously made from different profiles. Profiles which have given good results are, for example, folded profile for the frame elements and stamped foil for the corner elements. Brazing which takes place during that third step is performed between the metallic seal elements of both kinds and the adhesion layers which have been deposited onto peripheral zones of the glass panes in the first step of the process according to the invention. Brazing operations in the process according to the invention is performed at a temperature below 450° C. Suitable brazing materials are for instance tin, lead, copper, silver and tin-, lead-, copper-, silver-based alloys. The actions of supplying and brazing the metallic seal elements of both kinds and the adhesion layers are performed simultaneously. Between two corner metallic seal elements, it is understood that only one as well as several frame metallic seal elements may be placed. So, the term "multiple" means here that for each glazing edge, at least one frame metallic seal element is placed between two adjacent corner elements. Should several frame metallic seal elements be placed between corner elements, they may be all of the same length or not, indifferently. For larger pane sizes, several frame elements are always used. In a particular variant of the present invention, the frame is made of one frame metallic seal element between two adjacent corner elements. By frame is meant the continuous element resulting from the assembly of the corner metallic seal elements and the frame metallic seal elements.

The third step of the process allows advantageously the in situ formation of the frame. It allows avoiding a pre-assembly step of the corner and frame metallic seal elements. The use of these two kinds of metallic seal elements allows an efficient and cost competitive manufacturing of made-to-measure frames adapted to various sizes of glazings. For example, corner metallic seal elements could have fixed design and pre-formed straight metallic seal elements could be cut to the required dimensions to fit the glazing size.

There is further a fourth ending step in the process according to the invention which consists of the unloading of the finished glazing. That last step comprises the removal of the manufactured glazing from the area of processing and its transport to a storage area.

According to the process which is the object of the invention, the multiple straight frame metallic elements are supplied in the third step in a manner that they overlap each the adjacent frame or corner element. That overlapping is initially realized for a distance which does not exceed 3.5 mm and, preferably, not exceed 3.0 mm.

According to the process of the invention as well, during the brazing action of the third step, each metallic straight frame seal element is let to overlap further the adjacent frame or corner seal element by free dilatation under the effect of heat for finally forming the peripheral seal. At the end of the brazing action, said overlappings can reach a distance up to 2 cm. By free dilatation is here meant that the corner and frame metallic seal elements are free move relatively to each other due to their dilatation upon heating. The seal elements dilatation is absorbed in the overlapping areas which increase during the brazing action. As a result, the total frame expansion is advantageously significantly reduced even if the thermal dilatation of the seal elements is important. This effect is obtained thanks to the fact that the actions of the third step of the process are performed simultaneously. In consequence, the present process allows the manufacturing of large size glazings.

In a particular variant of the present invention, the mobility of the corner metallic seal elements is limited while the frame metallic seal elements are free to move upon heating. In this variant, the total frame expansion is further reduced and is close to zero, preferably, it is equal to zero. The mobility of the corner metallic seal elements may be limited for instance by mechanical means such as pressure or a stop element.

According to an embodiment of the process in accordance of the invention, the third step of the process may advantageously be performed inside a vacuum chamber. That embodiment is particularly preferred in situations where the implementation of a continuous process is contemplated. Vacuum level inside the chamber may be constant during the whole duration of steps 2 and 3 and at least equal to the high level aimed inside the void space(s) of the multiple glazing that will be manufactured. Alternatively, the vacuum level inside the chamber may be slightly lower than the high level of vacuum required inside the void space(s) of the finished multiple glazing during most of the time of steps 2 and 3, and may be boosted at the end of the third step only, just before the sealing of the glazing.

According to an alternative embodiment of the process in accordance of the invention, the third step of the process may be performed at atmospheric pressure and a supplemental step of atmospheric air elimination is interposed between the third and fourth step. This embodiment is more suited to discontinuous processes. It is realized generally by soldering on the peripheral seal a tube, e.g. a metallic tube, which establishes a communication between the inner space of the glazing and the atmosphere. The elimination of air can be done after by pumping it out. The tube is then closed when the aimed level of vacuum is reached.

In another embodiment of the process according to the invention, which is compatible with the preceding embodiments, the metal of the corner and frame metallic seal elements is selected from copper and copper alloys. It is preferable that the same metal or alloy grade is chosen for all the seal elements used in a given glazing and, in particular, for the corner and the frame seal elements.

According to another embodiment of the process in accordance with the invention, compatible with all the other embodiments, during the brazing operations, heat is supplied by the metallic seal elements themselves. This can be done e.g. by induction heating, which is preferred, because that technique is able to supply highly controllable and reproducible results. Moreover, brazing by induction heating can achieve very quick and localized heating, easily precisely focused on the region which is to be heated, without exceeding the aimed temperature. Brazing by induction allows hence an efficient manufacturing of the peripheral seal adapted to various sizes of glazings. Typical heating time of heating the seal elements by induction is no longer than 5 minutes and, preferably no longer than 3 minutes. Most preferably, heating time of the seal elements is no longer than 2 minutes. Localized heating means here a heating of the peripheral seal along all the edges of the panes without the requirement of heating also the glass panes. A matching of the thermal expansion coefficients of the seal material and the glass is no more required by the brazing operations. Brazing operations in the process according to the invention is performed at a temperature of from 180° C. up to 350° C. More preferably, the brazing temperature is from 200° C. up to 300° C. Temperatures which are the most preferred for the brazing operations are from 250° C. up to 300° C.

In the process in accordance with the invention, according another embodiment compatible with all the preceding ones, all the glass panes may have the same design and dimensions.

Alternatively, according another embodiment compatible with all the other embodiments, except the preceding one, the pane at the base of the stack has the greatest dimensions and the dimensions of each glass pane on top of that base pane are lower than the dimensions of the pane directly adjacent beneath, the resulting stack forming a kind of stepped pyramid.

Independently from the dimension embodiments of the panes in the process according to the invention, the corner and frame metallic seal elements may or not extend outside the surface edges of the glass panes. When they extend outside the surface edges of the glass panes, the corner and/or frame seal elements may enfold the entire stack borders. When they do not extend outside the surface edges of the panes, the corner and frame metallic seal elements may be located inside the area delimited by the edges of the glass panes, in a region not far from those edges.

In the particular case when all the panes have the same dimensions and the profile of the corner and frame metallic seal elements does not extend outside the surface edges of the glass panes, the corner and frame elements may be flush with the edges of the glass pane and the finished glazing.

Another particular case is when all the panes have the same dimensions and the corner and frame elements are brazed onto the edges of the glass panes.

The present invention relates as well to the glazing obtained by any of the embodiments of the process in accordance with the invention. The glazing obtained advantageously allows narrow tolerances on the peripheral seal design and thus narrow peripheral seal width could be targeted, for instance as narrow as 20 mm and lower. For a given window frame, a smaller peripheral seal width generally leads to a lower thermal transmittance of the window ($U_w$) by minimizing the thermal losses by conductibility of the glazing edges.

EXAMPLES

Figure 1:
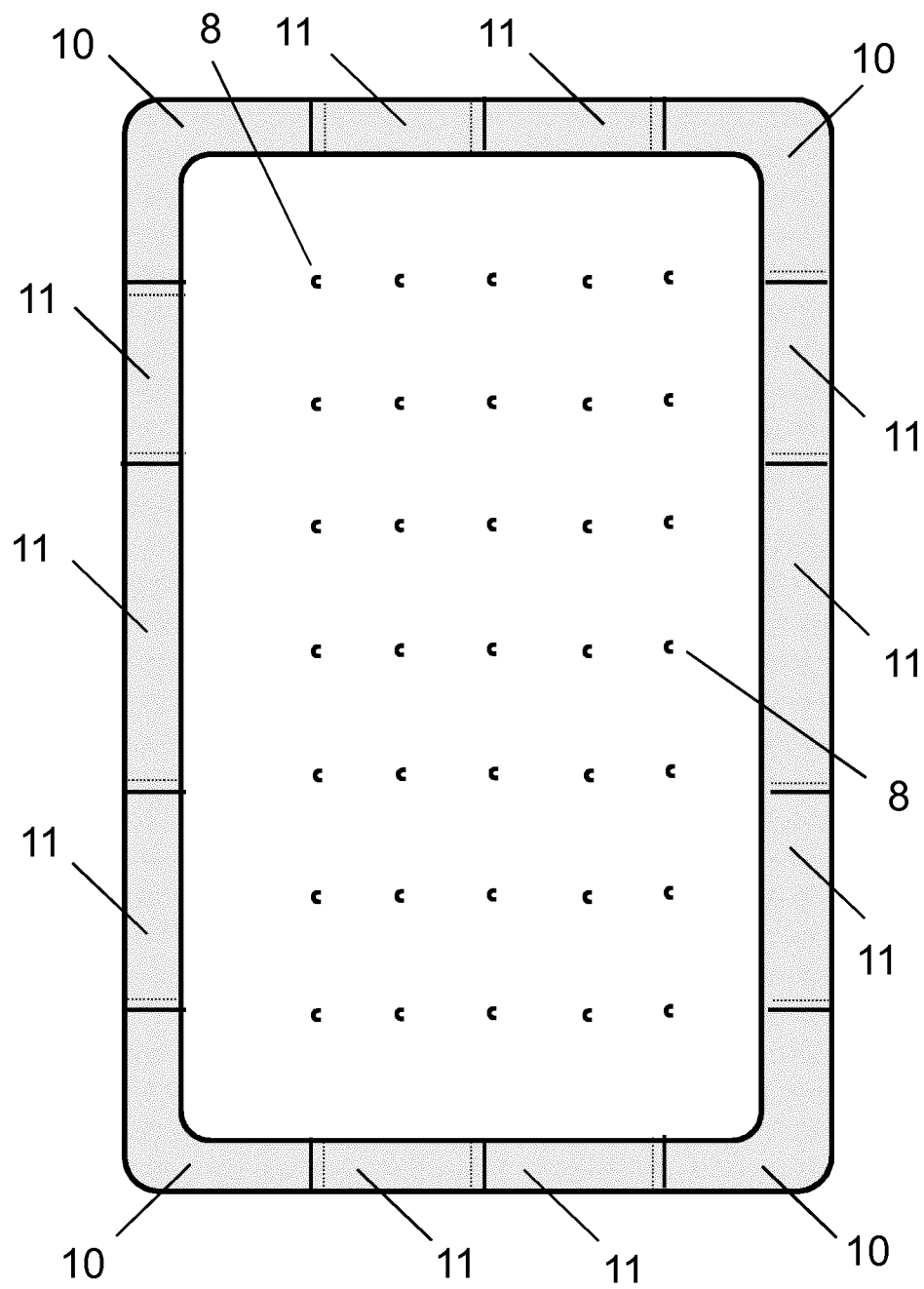
FIG. 1 illustrates a view in plan of a double glazing obtained according to the process of the invention, with the straight frame metallic elements 11 and the corner metallic elements 10 overlapping each other. Represented are as well the metallic spacers 8.

1. Reference Example (not According to the Invention)

According to previous art (description done in the patent application of AGC Glass Europe WO 2011/061208 A1), a double vacuum glazing has been processed with two different dimensions of 6 mm thick glass panes (572 mm*572 mm and 594 mm*594 mm). In order to reach low U-value (below 0.6 W/(m²·K)), a low-emissivity coated glass has been chosen for the small pane. A first seal adhesion layer of pure copper has been deposited by metal spraying (HVOF) on whole glasses periphery. The mean thickness of this layer has been 30 µm. The seal adhesion layer width has been 10 mm and the distance of the adhesion layer from the glass edge has been less than 1 mm. A second layer of $Sn_{60}Pb_{40}$ alloy has then been deposited manually on the first copper layer thanks to a soldering iron. The soldering iron temperature range has been maintained between 300° C. and 350° C. and was measured thanks to a type-K thermocouple. The measured thickness of this layer has been 300 µm in average. The measurements have been done randomly with a caliper all along the edges. Despite some thickness non-homogeneities due to the manual operations, the two layers were continuous all around the periphery of both the glass panes. Small metallic spacers (small stainless steel cylinders of 500 µm diameter) have been placed regularly each 5 cm on the largest glass pane. This operation has been performed manually using tweezers. A tinned copper frame and the second glass pane a have then been placed on the largest glass pane, on top of the steel spacers. The copper frame had previously been produced as follows.

Figure 2:
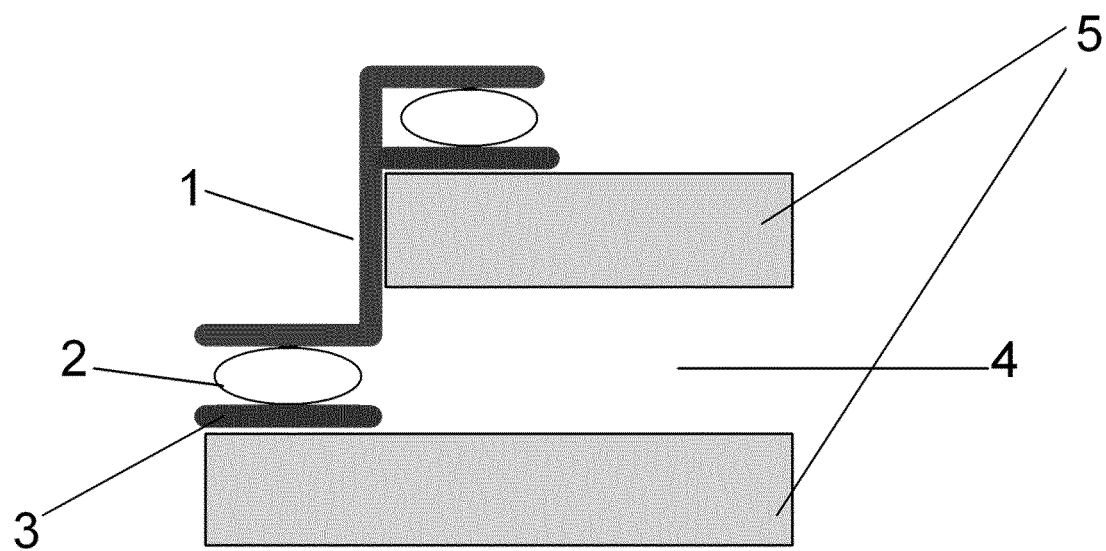
FIG. 2 shows a section of a double vacuum insulated glazing obtained according to the process of the invention wherein the glass panes 5 have not the same dimensions. Represented are the metal peripheral seal 1, the brazing solder 2, the adhesion layer 3 and the void space 4.
Figure 3:
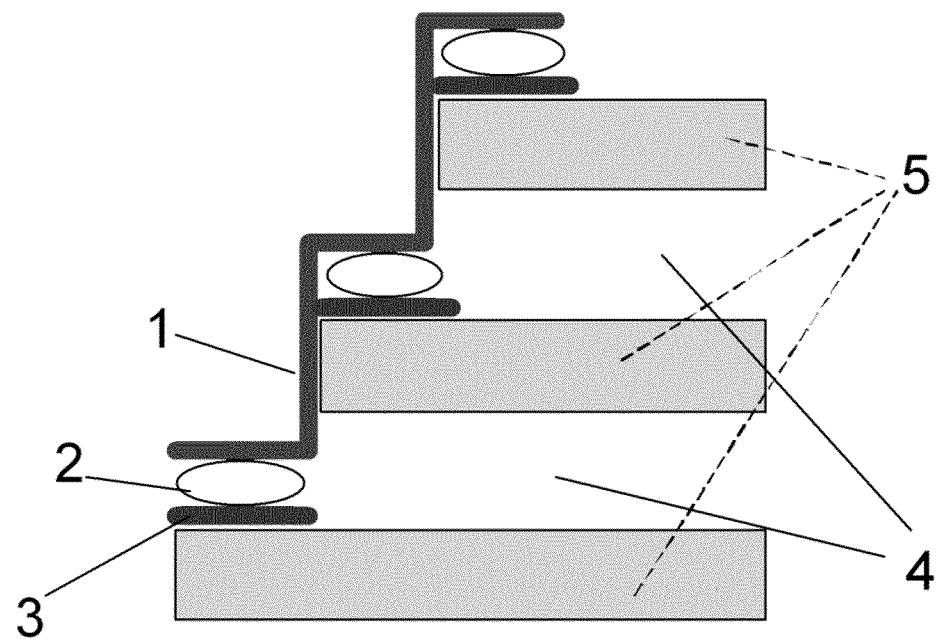
FIG. 3 shows a section of a triple vacuum insulated glazing obtained according to the process of the invention wherein the glass panes 5 have not the same dimensions and wherein references 1, 2, 3 and 4 have the same meaning as the ones from FIG. 2.
Figure 4:
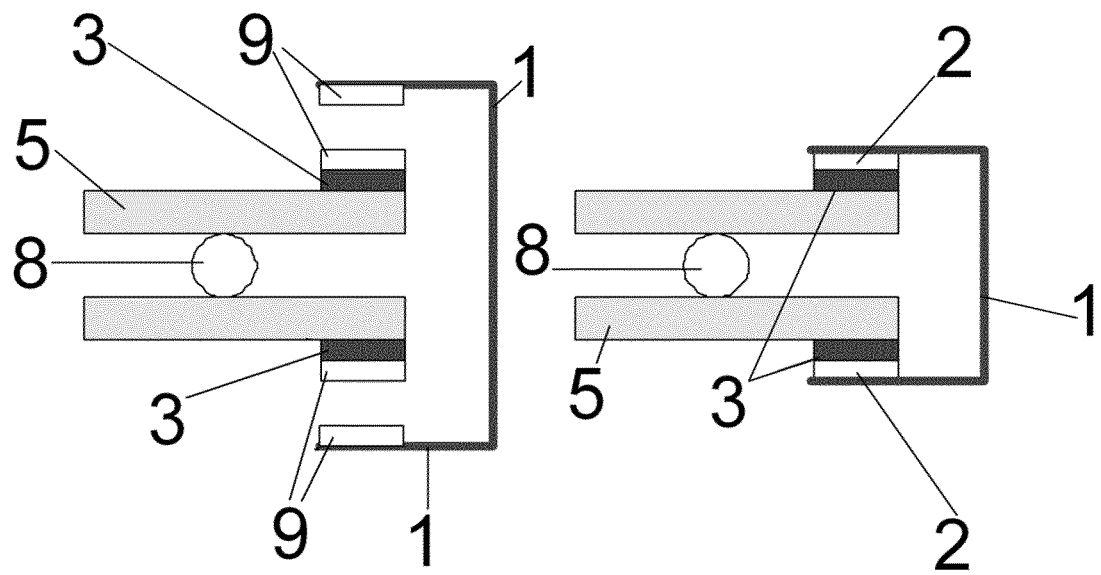
FIG. 4 is a section of a double vacuum insulated glazing obtained according to the process of the invention just before and after brazing the frame metal seal element 1 wherein both glass panes have the same dimensions and the metal seal element 1 enfolds the entire stack border. Represented is as well separated brazing solder layers 9 which form the single brazing solder layer 2 after brazing.
Figure 5:
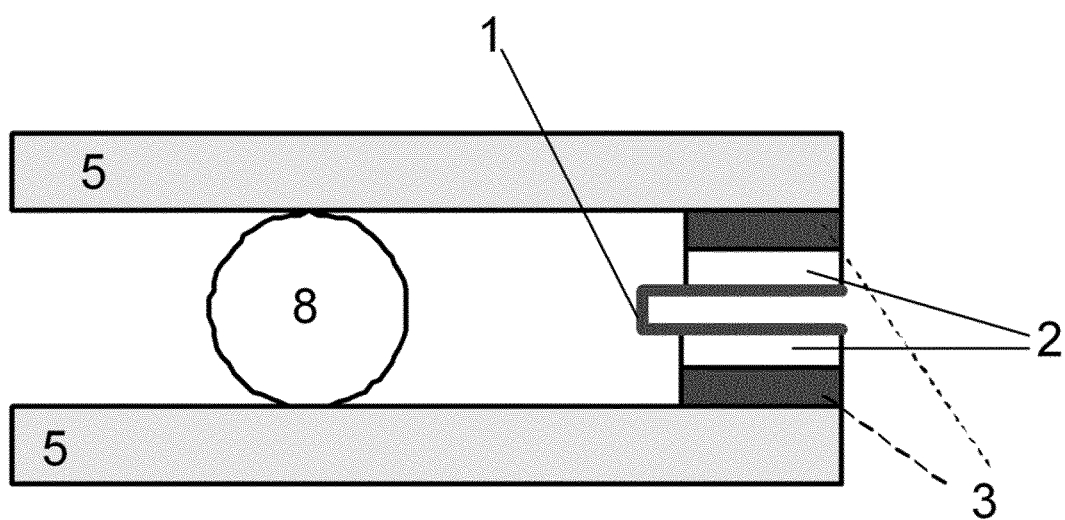
FIG. 5 is a section of a double vacuum insulated glazing obtained according to the process of the invention wherein both glass panes have the same dimensions and the frame metal peripheral seal element 1 is located inside the area delimited by the edges of the glass panes and is flush with those edges.
Figures 6, 7:
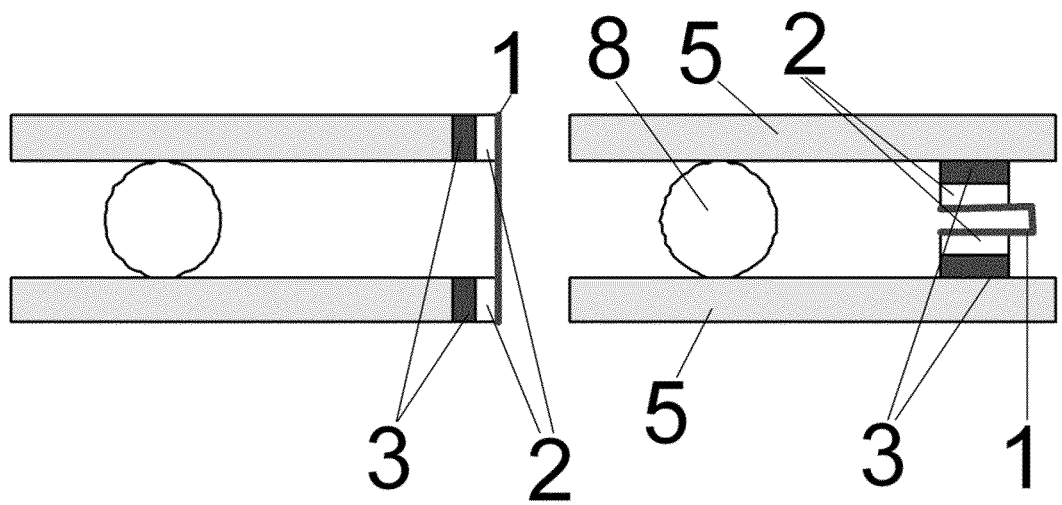
FIG. 6 illustrates a particular case wherein both glass panes have the same dimensions and the frame metallic seal element 1 is brazed onto the edges of the glass panes.
FIG. 7 is a section of a double glazing which is a variant of the one of FIG. 5 wherein the frame metallic seal element 1 edges is as well located inside the area delimited by the edges of the glass panes but is not flush with the edges.

Copper Frame Assembling:

Stamped corner pieces and folded straight pieces have been welded together by laser welding. After welding the junctions of the copper pieces, the obtained squared frame (574 mm*574 mm) has been tinned (10 µm of tin deposited by electrolysis). The frame obtained has presented a Z-shape section in order to be able joining the metallized areas of the two glass panes (like the one of FIG. 2).

The whole seal (zone edges of the first pane, the copper frame and zone edges of the second pane) has been placed in the vicinity of a copper induction ring. Eddy currents have been generated during 1 min in the copper frame and have heated the seal up to 300° C. The temperature has been measured thanks to an IR pyrometer placed near one corner of the glazing. During the process, all seal components (the metallized glass panes and the tinned copper frame) have been pressed together and thus maintained in close contact. The SnPb alloy on the glass panes and the tin on the frame have been re-melted during this step and have created a tight brazed seal all around the glazing. The average brazing width has been 5 mm. Due to the relatively high thermal expansion of the copper frame during that process, the measured copper frame dimensions after assembling have been increased of 3 mm in xy directions. In the chosen configuration, the treatment has been large enough on glass periphery to guaranty a tight seal join. It is of course mandatory that a sufficient part of the frame (5 mm) stays located on the tinned glass edges during and after the heating. Generally, the seal width has to be lower or equal to 20 mm in order to integrate it in a commercial window frame. In this case, due to process tolerances and thermal expansion encountered by the frame, some part of it were very close to the glass edges. Based on the observed geometry, keeping 20 mm seal will not be possible for large glazing dimensions (for a 3 m length dimension, the copper frame expansion will be of 15 mm and will thus not be achievable with this solution). A tube has been then brazed on the seal and has been used to pump out the glazing before closing it off. Before closing off this tube, the seal tightness has been evaluated with helium leak detector. No leakage has been observed. After pumping the glazing and closing off the tube, the evaluated thermal transmittance of the glazing has been 0.5 W/(m²·K). The evaluation has been done based on the method described in the EN674 standard (Glass in building.—Determination of thermal transmittance (U value)).

2. Example 1 (According to the Invention)

The glass pane edges have been metallized similarly to the reference example description. Dimensions of the panes were similar as well as the ones of the reference example. According to the invention the copper frame pieces which have been placed on the glass panes before assembling the whole glazing have been made of 4 different pieces per each edge (2 corner frame and 2 straight frames). The junctions of the two straight frames have been located at the middle of each edge. Before induction heating, the pieces have been allowed free to move relatively from each other thanks to the frame overlappings created in the junction areas (pieces were not pre-welded together as done in the reference example). The different frame pieces were thus free to expanse on each edges and to overlap each other further during the assembling process. The frame expansion and effect of the overlapping has been observed with an high speed camera. The solution according to the invention has reduced the relative movement occurring between the frame corners and the glass panes. The total frame dimension has been increased by 1 mm only (3 times less than encountered with the reference example). Based on the observed dimensions, the main advantage of the invention is to combine smaller seal width with a larger glazing dimensions. For a targeted glazing dimension, compromise could be done in term of seal width, complexity of process (larger tolerances could be used during the frame positioning) and the number of frame pieces if necessary. For a fixed window frame, a smaller seal width will generally allow a lower thermal transmittance of the window (by minimising thermal losses by conductibility of the glazing edges). In the present example, the measured U-value of the glazing has been found unchanged compared to the reference solution.

3. Example 2 (According to the Invention)

According to the preferred solution, a glazing has been produced with a frame made of four corner pieces of 5 cm*5 cm and four straight pieces (of about 476 mm length). The corners pieces were maintained in place during the induction heating step (higher pressure was applied on the corner during the heating). The straights pieces have expanded of 2 times 1.5 mm below each side of the corner pieces. Thanks to the relative fixed positions of the corner pieces, the final glazing dimensions were no more impacted during the heating. In this case the seal width has appeared non-dependant of the glazing size (the overlap has performed as a buffer). The overlapping area size has been directly proportional to the glazing dimensions, without impacting the total seal width. Same trials have been successfully done as well with a 12 mm seal width (compared to a 20 mm seal width used for previous examples).

The invention claimed is:

1. A process for manufacturing a vacuum insulating glazing, the process comprising, in the following order:
   a) first, depositing an adhesion layer onto a peripheral zone on one side of each of at least two glass panes;
   b) second, supplying the glass panes separated with a set of metallic spacers in a stack alignment as a pane stack;
   c) third, assembling the glazing by:
      c1) supplying corner metallic seal elements at each corner of the pane stack onto the adhesion layers of each glass pane,
      c2) supplying multiple frame metallic seal elements on edges of the glass panes between the corner metallic seal elements, and
      c3) simultaneously brazing the corner and frame metallic seal elements onto the adhesion layers, thereby obtaining a finished glazing of each glass pane; and
   d) fourth, unloading the finished glazing,
   wherein
   the glazing comprises the at least two glass panes, the set of metallic spacers located in a void space between the glass panes, and a peripheral seal ensuring a vacuum tightness between the glass panes,
   the multiple frame metallic seal elements are supplied so that each frame metallic seal element overlaps an adjacent frame or corner metallic seal element for a distance no greater than 3.5 mm, and
   each frame metallic seal element overlaps further the adjacent frame or corner metallic seal element by free dilatation during the brazing for forming the peripheral seal.

2. The process according to claim 1, wherein the assembling c) is performed in a vacuum chamber.

3. The process according to claim 1, wherein
   the assembling c) is performed at atmospheric pressure and
   the process further comprises: soldering at least one closable metallic tube on the peripheral seal, through which atmospheric air is pumped out in order to reach vacuum between the glass panes.

4. The process according to claim 1, wherein each of the corner and frame metallic seal elements independently comprises Cu or a Cu alloy.

5. The process according claim 1, wherein heat is supplied by the corner metallic seal elements during the brazing c1).

6. The process according to claim 5, wherein the metallic seal elements are quickly heated by induction heating.

7. The process according to claim 6, wherein the induction heating lasts for no longer than 5 minutes.

8. The process according to claim 1, wherein the brazing c3) is performed at a temperature of from 200 up to 300° C.

9. The process according to claim 1, wherein the corner and frame metallic seal elements are made from a same metal.

10. The process according to claim 1, wherein all the glass panes have the same dimensions.

11. The process according to claim 1, wherein a glass pane at a base of the pane stack has greatest dimensions and each glass pane has dimensions lower than dimensions of a glass pane located directly underneath.

12. The process according to claim 1, wherein a profile of the corner and frame metallic seal elements does not extend outside surface edges of the glass panes.

13. The process according to claim 12, wherein the profile of the corner and frame metallic seal elements are flush with edges of the glass pane and the glazing.

14. The process according to claim 1, wherein a profile of the corner and frame metallic seal elements extend outside surface edges of the glass panes and enfold borders of the entire pane stack.

15. A glazing obtained by the process according to claim 1.

16. The process according to claim 1, wherein c1) and c3) are performed simultaneously.

17. A process for manufacturing a vacuum insulating glazing, the process comprising, in the following order:
   a) first, depositing an adhesion layer onto a peripheral zone on one side of each of at least two glass panes;
   b) second, supplying the glass panes separated with a set of metallic spacers in a stack alignment as a pane stack;
   c) third, assembling the glazing by:
      c1) supplying corner metallic seal elements at each corner of the pane stack onto the adhesion layers of each glass pane,
      c2) supplying multiple frame metallic seal elements on edges of the glass panes between the corner metallic seal elements, and
      c3) simultaneously brazing the corner and frame metallic seal elements onto the adhesion layers, thereby obtaining a finished glazing of each glass pane; and
   d) fourth, unloading the finished glazing,
   wherein
   the glazing comprises the at least two glass panes, the set of metallic spacers located in a void space between the glass panes, and a peripheral seal ensuring a vacuum tightness between the glass panes,
   the multiple frame metallic seal elements are supplied so that each frame metallic seal element overlaps an adjacent frame or corner metallic seal element, and
   each frame metallic seal element overlaps further the adjacent frame or corner metallic seal element by free dilatation during the brazing for forming the peripheral seal.

* * * * *